(12) United States Patent
Yamazaki et al.

(10) Patent No.: US 7,483,153 B2
(45) Date of Patent: Jan. 27, 2009

(54) POWER-SAVING CONTROL METHOD IN LASER MEASURING SYSTEM AND LASER MEASURING SYSTEM

(75) Inventors: Takaaki Yamazaki, Itabashi-ku (JP); Yasutaka Katayama, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 12/072,635

(22) Filed: Feb. 27, 2008

(65) Prior Publication Data

US 2008/0231839 A1    Sep. 25, 2008

(30) Foreign Application Priority Data

Mar. 22, 2004    (JP)    ............... 2007-075362

(51) Int. Cl.
    *G01B 11/14*    (2006.01)
(52) U.S. Cl. .................................................. 356/614
(58) Field of Classification Search ............... 356/614; 250/559.29
    See application file for complete search history.

(56) References Cited

U.S. PATENT DOCUMENTS

2008/0218739 A1*    9/2008    Yamazaki et al. ............ 356/72

FOREIGN PATENT DOCUMENTS

| JP | 11-166832   | 6/1999  |
|----|-------------|---------|
| JP | 2000-356517 | 12/2000 |
| JP | 2005-337741 | 12/2005 |
| JP | 2006-214850 | 8/2006  |

* cited by examiner

*Primary Examiner*—Roy M Punnoose
(74) *Attorney, Agent, or Firm*—Nields & Lemack

(57) ABSTRACT

A power-saving control method in a laser measuring system, which comprises a laser rotary irradiation device for forming a laser reference plane by projecting a laser beam in rotary irradiation and a photodetection device for carrying out position measurement by receiving the laser beam, comprising a step of detecting using status of the photodetection device by the photodetection device, a step of selecting steady operation or power-saving mode based on the detection of using status, a step of transmitting a power-saving mode transition instruction to the laser rotary irradiation device by the photodetection device when the power-saving mode is selected, a step of receiving the power-saving mode transition instruction by the laser rotary irradiation device, and a step of executing power-saving control.

10 Claims, 8 Drawing Sheets

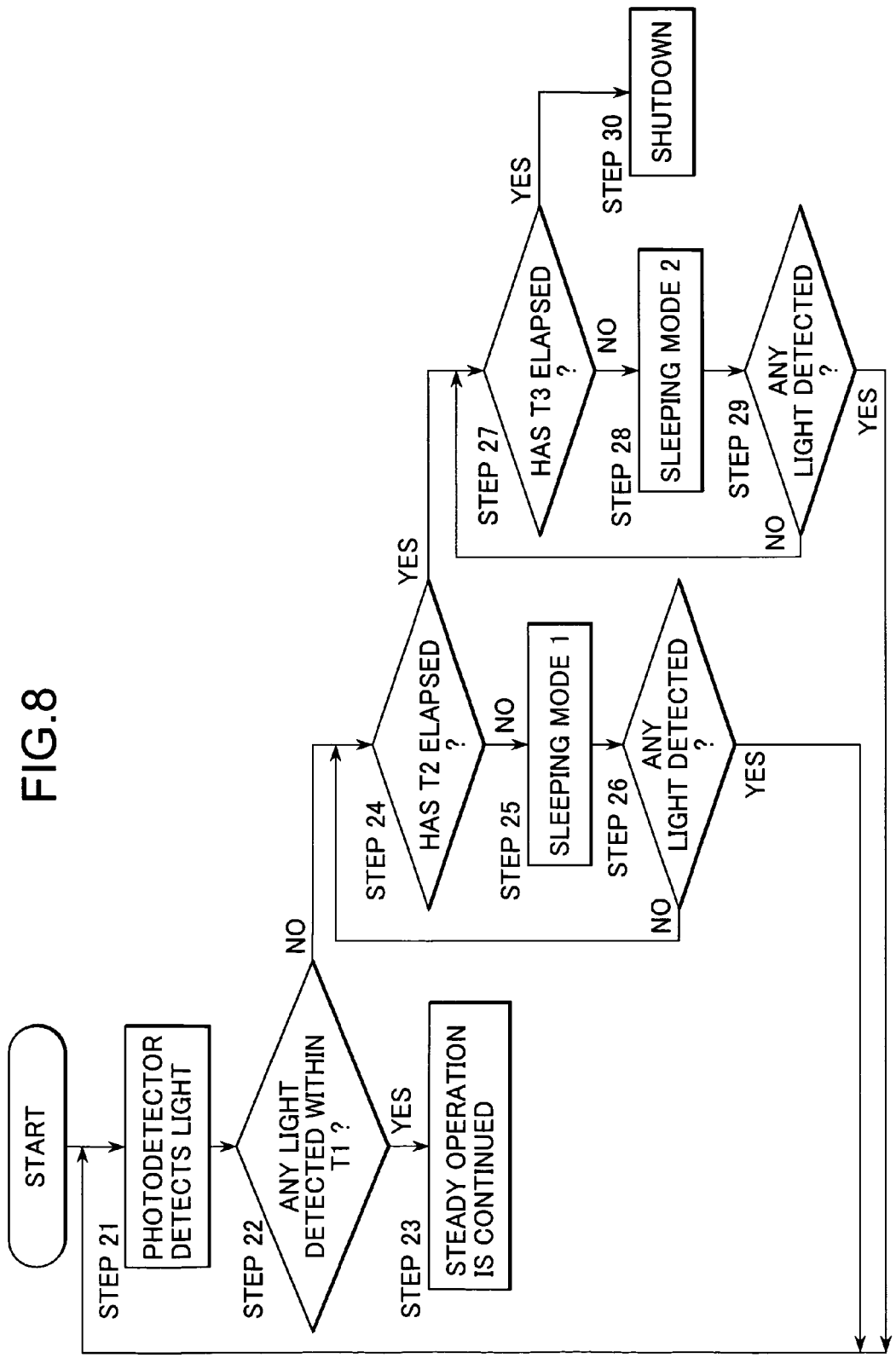

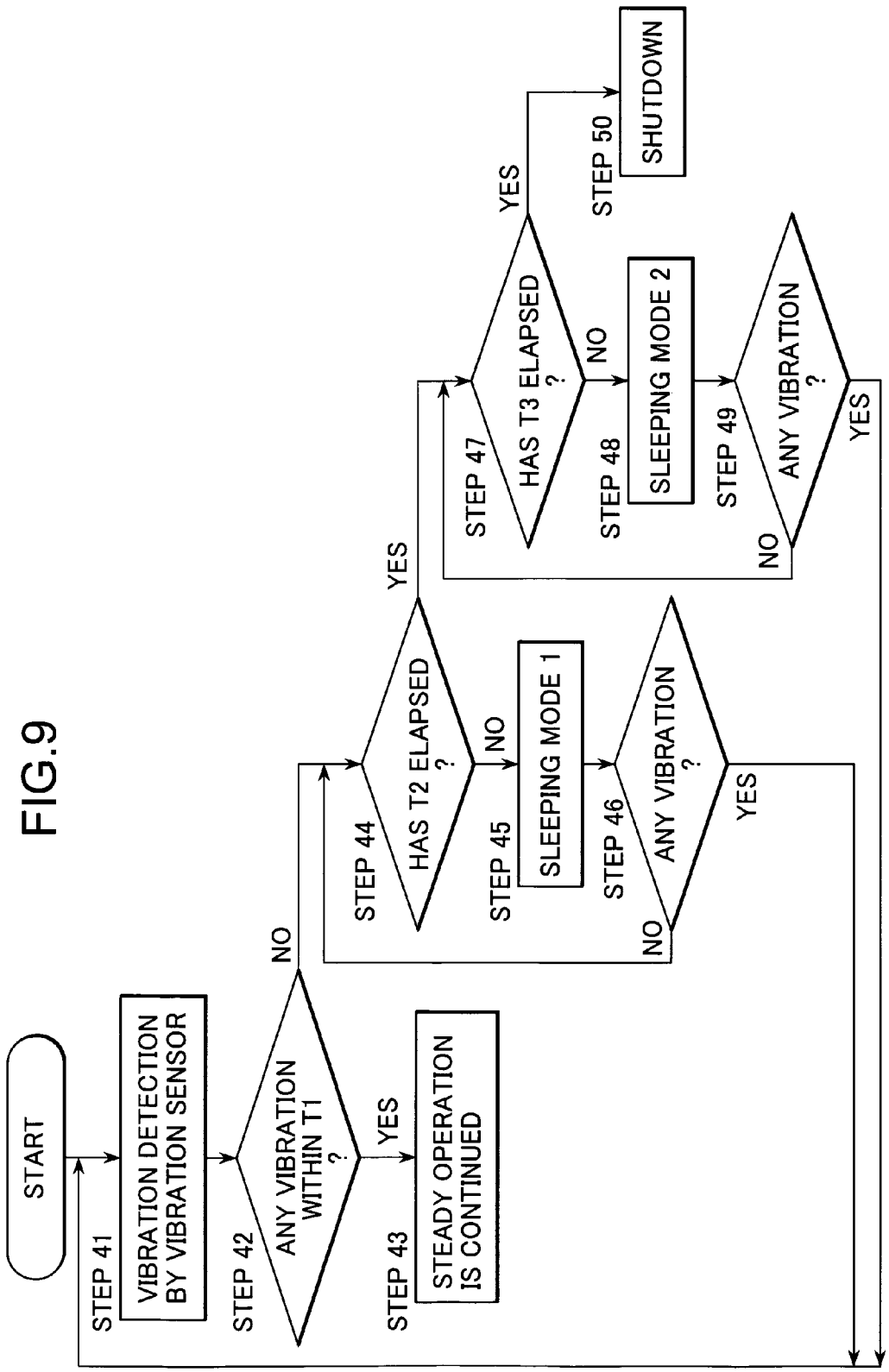

POWER-SAVING CONTROL METHOD IN LASER MEASURING SYSTEM AND LASER MEASURING SYSTEM

BACKGROUND OF THE INVENTION

The present invention relates to a laser measuring system for forming a reference plane by projecting a laser beam in rotary irradiation from a laser rotary irradiation device, for receiving the laser beam by a photodetection device (light receiving device), and for measuring a position of operation or the like.

In the past, a laser rotary irradiation device has been known as a device for forming a reference plane to indicate a reference for operation in a wide range, and a photodetection device has been known as a device for receiving a laser beam and for measuring a position of the reference plane.

A laser rotary irradiation device forms a reference plane by projecting a laser beam with spot-like luminous flux in rotary irradiation. For instance, by projecting the laser beam in rotary irradiation within a horizontal plane, a horizontal reference plane can be formed. When the laser beam is projected in rotary irradiation within a vertical plane, a vertical reference plane can be formed. When the laser beam is projected in rotary irradiation within a tilted plane, a tilted reference plane can be formed.

A photodetection device has a photodetector for receiving and detecting a laser beam. Based on the laser beam detected by the photodetector, a horizontal reference position, a vertical reference position, etc. can be measured. A laser measuring system can be made up by combining the laser rotary irradiation device and the photodetection device. The laser measuring system using the reference plane formed by the laser beam is used for from the operation in wide range including civil engineering work to the operation in relatively limited space such as room interior finishing work, for example.

When civil engineering work is carried out, for instance, by using the laser measuring system as described above, ground-leveling work or the like is performed within a range of 100 m to 500 m in radius with the rotary laser beam at the center. In civil engineering work such as ground-leveling operation, the use of the reference plane is limited only to temporary use for level alignments, and the reference plane is not needed at all times. Also, in the case the work is temporarily suspended, the reference plane is not used as a matter of course.

However, in case the operation is performed for a wide range in space, when it is in a condition where the reference plane is not needed for the operation, it is troublesome and reduces working efficiency that power to the laser rotary irradiation device is turned on or off each time the condition may arise. In the situation as generally practiced up to now, if the laser rotary irradiation device is driven for once, the laser beam may be continuously projected in rotary irradiation for all day long. This is very wasteful if it is considered from the viewpoint of the efficiency in the use of the reference plane.

On the other hand, a battery is used as the power source for the laser rotary irradiation device, and there are limits in the power supply from the battery. This means that the time to use the laser measuring system may be limited. When the operation by using the laser measuring system is carried out for long time, the battery must be replaced periodically, and spare batteries are needed. Also, the operation must be interrupted during the exchange of batteries. In some cases, it is necessary to perform the setting of the reference plane again. This results in lower working efficiency.

Under the circumstances as described above, there have been strong demands to save the power when the laser measuring system is used.

JP-A-2000-356517 discloses an invention for power-saving control on the photodetection device.

SUMMARY OF THE INVENTION

It is an object of the present invention to provide a power-saving control method in a laser measuring system, by which it is possible to control the driving and to save power for the laser measuring system so that power consumption on the laser rotary irradiation device or on the photodetection device can be reduced when the level measurement by using a reference plane is not performed or when the operation by using a reference plane is not performed.

To attain the above object, the present invention provides a power-saving control method in a laser measuring system, which comprises a laser rotary irradiation device for forming a laser reference plane by projecting a laser beam in rotary irradiation and a photodetection device for carrying out position measurement by receiving the laser beam, comprising a step of detecting using status of the photodetection device by the photodetection device, a step of selecting steady operation or power-saving mode based on the detection of using status, a step of transmitting a power-saving mode transition instruction to the laser rotary irradiation device by the photodetection device when the power-saving mode is selected, a step of receiving the power-saving mode transition instruction by the laser rotary irradiation device, and a step of executing power-saving control. Also, the present invention provides a power-saving control method in a laser measuring system as described above, wherein the using status of the photodetection device is judged by detecting at least one of laser beam photodetecting condition by the photodetection device, changes over time of tilting of the photodetection device, and vibration of the photodetection device. Further, the present invention provides a power-saving control method in a laser measuring system as described above, wherein the transition to the power-saving mode is judged based on the fact that non-using status of the photodetection device has continued for a predetermined time period. Also, the present invention provides a power-saving control method in a laser measuring system as described above, wherein the power-saving mode includes at least power-saving operation and shutdown of power supply of the laser rotary irradiation device. Further, the present invention provides a power-saving control method in a laser measuring system as described above, wherein the power-saving mode includes power-saving operations of the laser rotary irradiation device and the photodetection device and shutdowns of power supply to the laser rotary irradiation device and the photodetection device. Also, the present invention provides a power-saving control method in a laser measuring system as described above, wherein leveling operation of the laser rotary irradiation device is also maintained during the power-saving mode.

Further, the present invention provides a laser measuring system, which comprises a laser rotary irradiation device and a photodetection device, wherein the laser rotary irradiation device comprises a laser beam emitter, a rotator for projecting a laser beam in rotary irradiation, a first communication means for performing communication to and from the photodetection device, and a first control unit for controlling operation status of the laser rotary irradiation device including light emitting condition of the laser beam emitter and rotating condition of the rotator to steady operation and to power-saving mode, and wherein the photodetection device comprises a photodetector for detecting the laser beam, a second communication means for performing communication to and from the laser rotary irradiation device, a using status detecting means for detecting the using status of the photodetection device, and a second control unit for judging transition to power-saving mode based on the result of detection from the using status detecting means, wherein a power-saving mode transition instruction is transmitted to the laser rotary irradiation device via the second communication means and the first communication means, and the first control unit controls operating status of the laser rotary irradiation device to the power-saving mode based on the power-saving transition instruction. Also, the present invention provides the laser measuring system as described above, wherein the using status detecting means is at least one of a photodetector for detecting the photodetecting condition of the laser beam, a tilt sensor for detecting the tilting of the photodetection device and a vibration sensor for detecting the vibration of the photodetection device. Further, the present invention provides the laser measuring system as described above, wherein, in the power-saving mode, the light emitting condition of the laser beam of the laser rotary irradiation device is controlled to the decrease of emission light amount or to the stopping of the light emission. Also, the present invention provides the laser measuring system as described above, wherein, in the power-saving mode, the rotation status of the rotator of the laser rotary irradiation device is controlled to the decrease of rotation speed or to the stopping of rotation.

According to the present invention, in a power-saving control method in a laser measuring system, which comprises a laser rotary irradiation device for forming a laser reference plane by projecting a laser beam in rotary irradiation and a photodetection device for carrying out position measurement by receiving and detecting the laser beam, comprising a step of detecting using status of the photodetection device by the photodetection device, a step of selecting steady operation or power-saving mode based on the detection of using status, a step of transmitting a power-saving mode transition instruction to the laser rotary irradiation device by the photodetection device when power-saving mode is selected, a step of receiving the power-saving mode transition instruction by the laser rotary irradiation device, and a step of executing power-saving control. As a result, under the condition where the laser measuring system is not currently used, the power consumed by the laser rotary irradiation device can be reduced, and power consumption in the laser measuring system can be saved.

Also, according to the present invention, the power-saving mode includes at least power-saving operation and shutdown of power supply of the laser rotary irradiation device. This makes it possible to save power both on the laser rotary irradiation device and the photodetection device, and shutdown of power supply is helpful in preventing unintentional failure to turn off the power at the termination of operation.

Further, according to the present invention, there are provided a laser rotary irradiation device and a photodetection device, wherein the laser rotary irradiation device comprises a laser beam emitter, a rotator for projecting a laser beam in rotary irradiation, a first communication means for performing communication to and from the photodetection device, and a first control unit for controlling operation status of the laser rotary irradiation device including light emitting condition of the laser beam emitter and rotating condition of the rotator to steady operation and to power-saving mode, and wherein the photodetection device comprises a photodetector for detecting the laser beam, a second communication means for performing communication to and from the laser rotary irradiation device, a using status detecting means for detecting the using status of the photodetection device, and a second control unit for judging transition to power-saving mode based on the result of detection from the using status detecting means, wherein a power-saving mode transition instruction is transmitted to the laser rotary irradiation device via the second communication means and the first communication means, and the first control unit controls operation status of the laser rotary irradiation device to the power-saving mode based on the power-saving transition instruction. As a result, under the condition where the laser measuring system is not currently used, the power consumed by the laser rotary irradiation device can be reduced, and power consumption in the laser measuring system can be reduced. Also, transition to the power-saving mode can be carried out without the operation by an operation staff, and this is helpful in eliminating waste caused by unintentional failure in operation.

BRIEF DESCRIPTION OF THE DRAWINGS

FIG. 8 is a flow chart of a second embodiment of the invention; and

FIG. 9 is a flow chart of a third embodiment of the invention.

DETAILED DESCRIPTION OF THE PREFERRED EMBODIMENTS

Detailed description will be given below on the best mode aspect for carrying out the invention by referring to the attached drawings.

Figure 1:
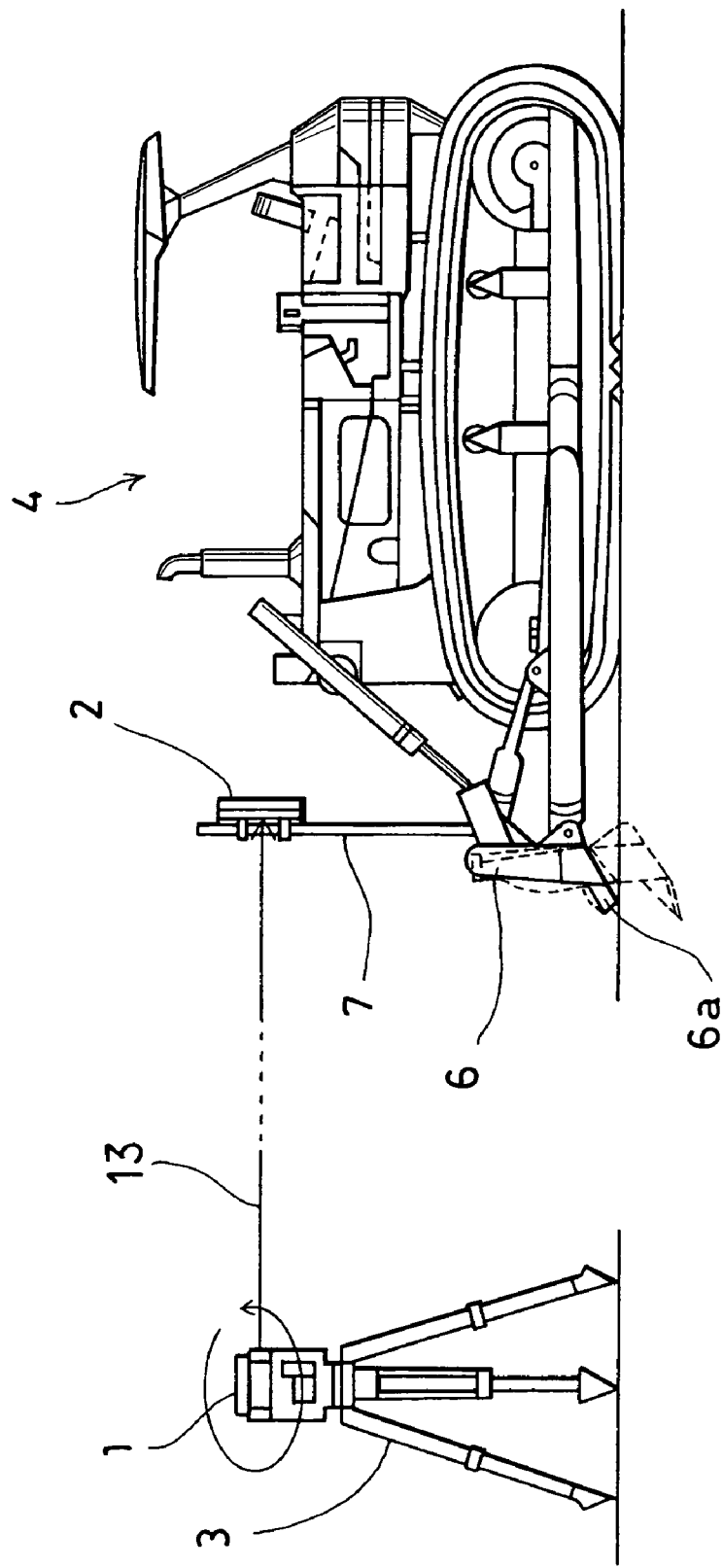
FIG. 1 is an overall view of an embodiment of the present invention.

FIG. 1 shows a case where the laser measuring system according to the present invention is applied in civil engineering work.

In FIG. 1, reference numeral 1 denotes a laser rotary irradiation device, and numeral 2 represents a photodetection device (a light receiving device).

The laser rotary irradiation device 1 is installed at a predetermined point, preferably at a known point, and at a known height via a tripod 3. The photodetection device 2 is mounted at a position as required on a construction machine 4 such as a dozer. More concretely, the photodetection device 2 is fixedly mounted on a mounting pole 7 erected on an operation tool, e.g. a blade 6, of the construction machine 4. In this case, it is assumed that a distance from a reference position for photodetection (light receiving) of the photodetection device 2 to the position of a blade edge 6a of the blade 6 is already known.

A laser beam 13 is projected by the laser rotary irradiation device 1 in rotary irradiation. The laser beam 13 is then detected by the photodetection device 2. In this case, the height of the blade 6 is controlled and adjusted so that photodetecting position at the photodetection device 2 is maintained at a predetermined position, and ground-leveling operation can be carried out accurately as per the plane as planned.

Figure 2:
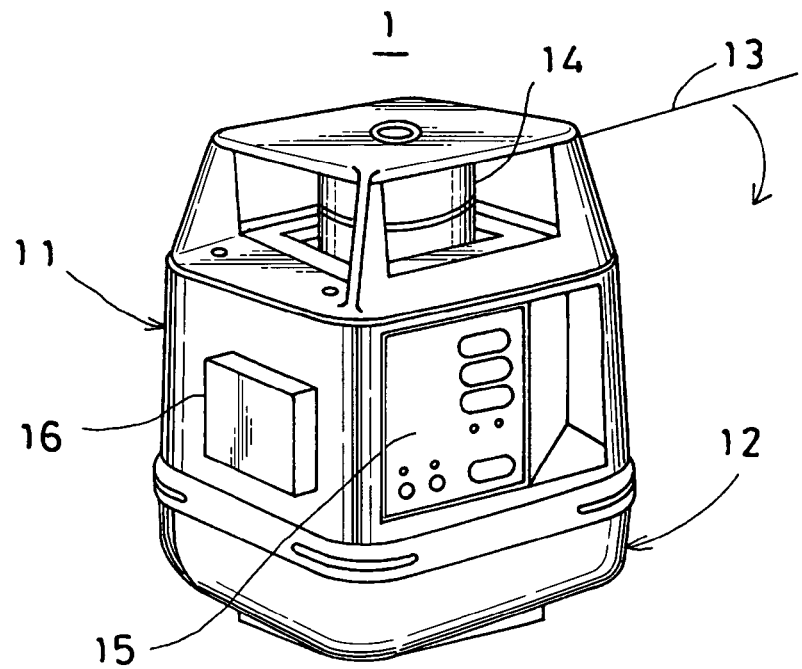
FIG. 2 is a perspective view of an example of a laser rotary irradiation device used in the present invention.

FIG. 2 shows an example of the laser rotary irradiation device 1, which comprises a main unit 11 for containing a laser beam emitter, a projection optical system, a rotary driving mechanism, a leveling unit, etc., a power source accommodating unit 12 for accommodating power source such as battery, and a rotator 14 for deflecting the direction of the laser beam 13 to a horizontal direction and projecting the laser beam 13 in rotary irradiation. The main unit 11 further comprises an operation unit 15 and a first communication unit 16 such as a radio device.

Figure 3:
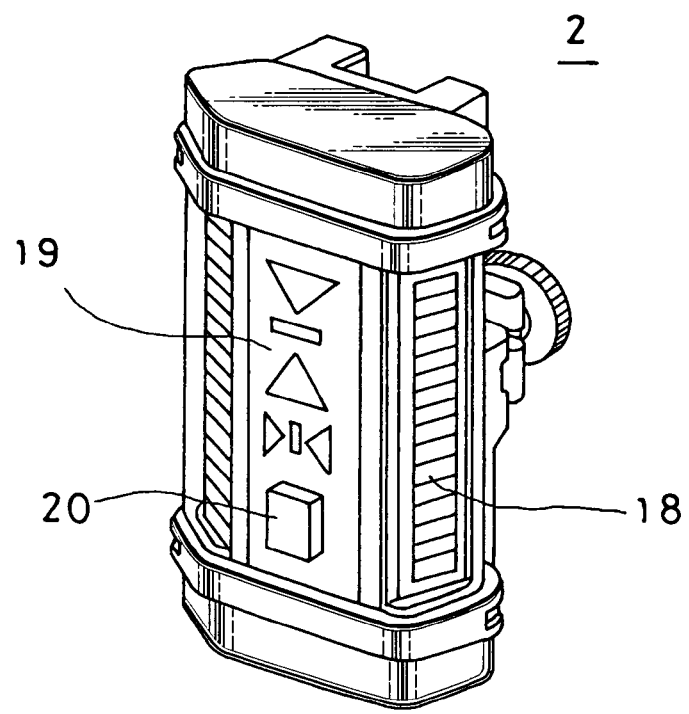
FIG. 3 is a perspective view of an example of a photodetection device used in the invention.

FIG. 3 shows an example of the photodetection device 2. The photodetection device 2 is so designed that the photodetection device 2 is mounted on the mounting pole 7, for instance. The photodetection device 2 comprises a photodetector 18, a display unit 19 for indicating photodetecting condition, and a second communication unit 20 such as a radio device, which mutually communicates with the first communication unit 16. Inside the photodetection device 2, a control unit (to be described later) is provided. The control unit judges operation status of the construction machine 4 based on the result of photodetection by the photodetector 18, and also judges the operation status of the construction machine 4 based on a tilt sensor as described later, and the control unit controls power-saving condition of the photodetection device 2 and power-saving condition of the laser rotary irradiation device 1.

Figure 4:
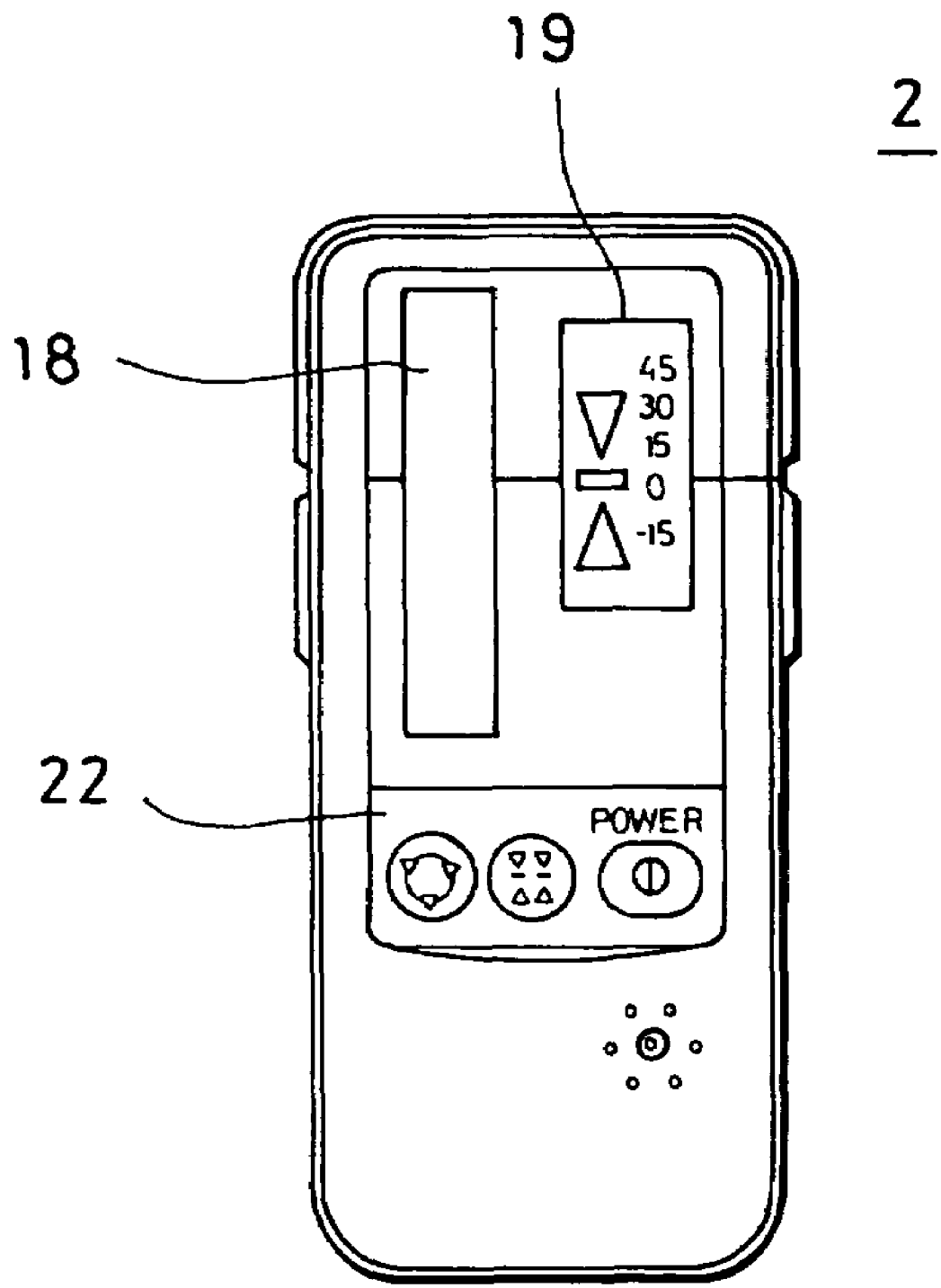
FIG. 4 is a front view of another example of the photodetection device used in the invention.

FIG. 4 represents another example of the photodetection device 2, which is designed as a portable unit. The photodetection device 2 comprises a photodetector 18, a display unit 19, an operation unit 22 and a communication unit (not shown). Similarly to the photodetection device 2 as shown in FIG. 3, there is provided inside the photodetection device 2 a control unit, which detects the level of photodetection light amount and determines light emitting condition of the laser rotary irradiation device 1 based on the result of detection.

Figure 5:
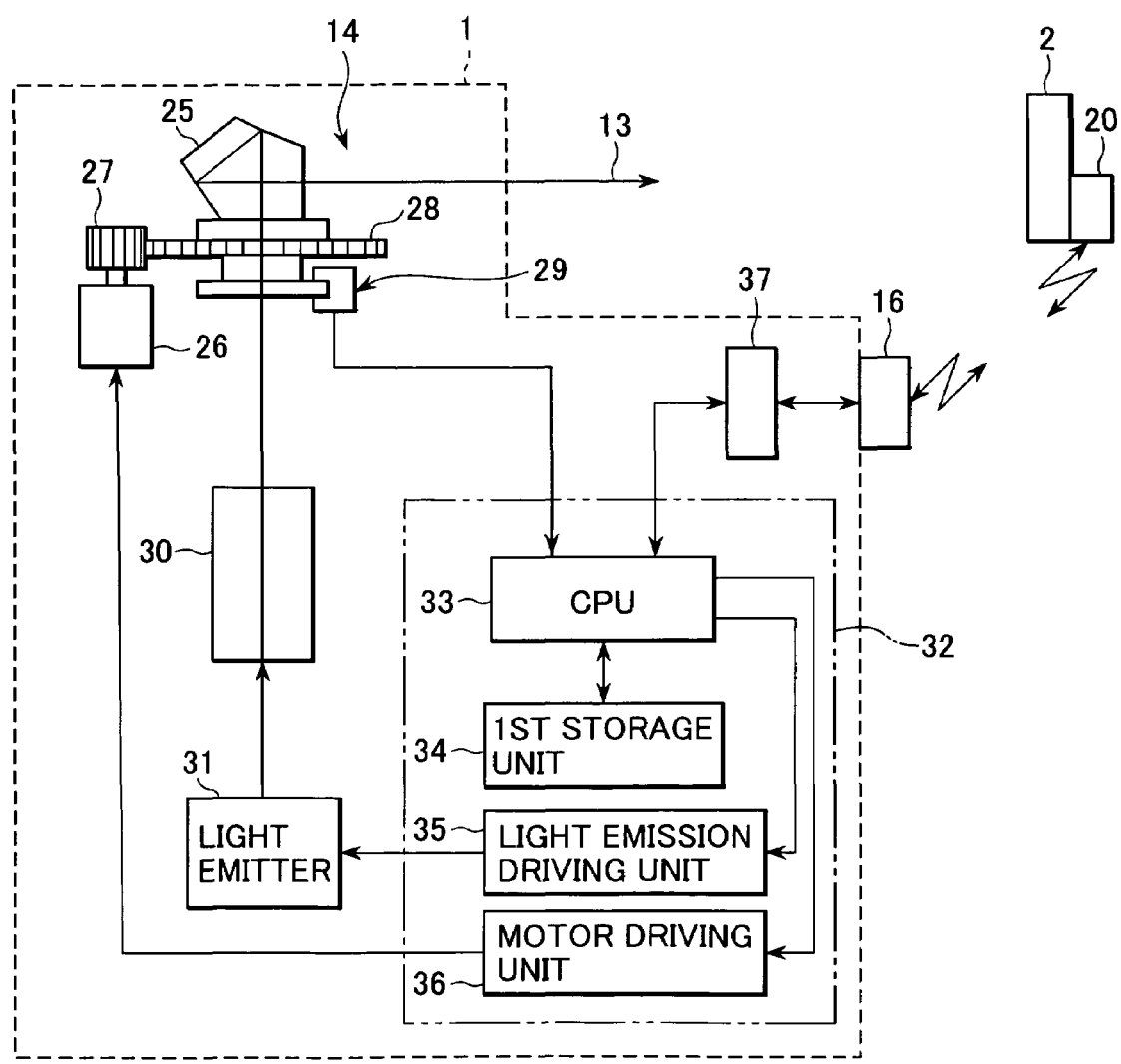
FIG. 5 is a schematical block diagram of a laser rotary irradiation device used in the invention.

Now, referring to FIG. 5, description will be given on approximate arrangement of the laser rotary irradiation device 1.

The rotator 14 has a pentagonal prism 25, which is a deflecting optical member which is rotatably supported, and the pentagonal prism 25 is rotated by a scanning motor 26 via a driving gear 27 and a rotary gear 28. It is so designed that a rotation angle of the pentagonal prism 25 is detected by a rotary encoder 29.

The laser beam 13 emitted from a laser beam emitter 31 enters the pentagonal prism 25 via a projection optical system 30 and is projected after being deflected in a horizontal direction by the pentagonal prism 25.

Driving status such as driving, stopping and control of rotation speed of the scanning motor 26 are controlled by a control unit 32. Light emitting condition such as light emission, turning-off of the light, increase or decrease of the light emission light amount, etc. of the laser beam emitter 31 are controlled by the control unit 32.

The control unit 32 comprises a first arithmetic unit 33, a first storage unit 34, a light emission driving unit 35, and a motor driving unit 36. An angle detection signal from the rotary encoder 29 is inputted to the first arithmetic unit 33, and the scanning motor 26 is controlled to rotate at a predetermined constant speed via the motor driving unit 36 according to the angle detection signal.

A signal transmitted from the first communication unit 16 or a signal received at the first communication unit 16 is inputted to or outputted from the first arithmetic unit 33 via an input/output control unit 37. For instance, a signal transmitted from the photodetection device 2 is received at the first communication unit 16 and is inputted to the first arithmetic unit 33 via the input/output control unit 37. The result of calculation at the first arithmetic unit 33 and an instruction to the photodetection device 2, etc. are transmitted to the photodetection device 2 by the first communication unit 16 via the input/output control unit 37.

The light emission driving unit 35 emits light and turns off light at the laser beam emitter 31 based on an instruction from the first arithmetic unit 33. The light emission driving unit 35 has a function as an emission light amount adjusting means of the laser beam emitter 31. Based on an instruction to increase or decrease the light amount from the first arithmetic unit 33, the light emission driving unit 35 controls the emission light amount of the laser beam emitter 31 to the measuring status or to set to the sleeping status by decreasing the light amount.

Various types of programs and data are stored in the first storage unit 34. These programs and data include: a control program to drive the scanning motor 26 at a constant speed or to increase or decrease the speed, a control program to control the light amount of the laser beam emitter 31, a setting value necessary for the control, a data table, and further, as described later, a power-saving program for the laser rotary irradiation device to set the power-saving condition in the stages as required.

Figure 6:
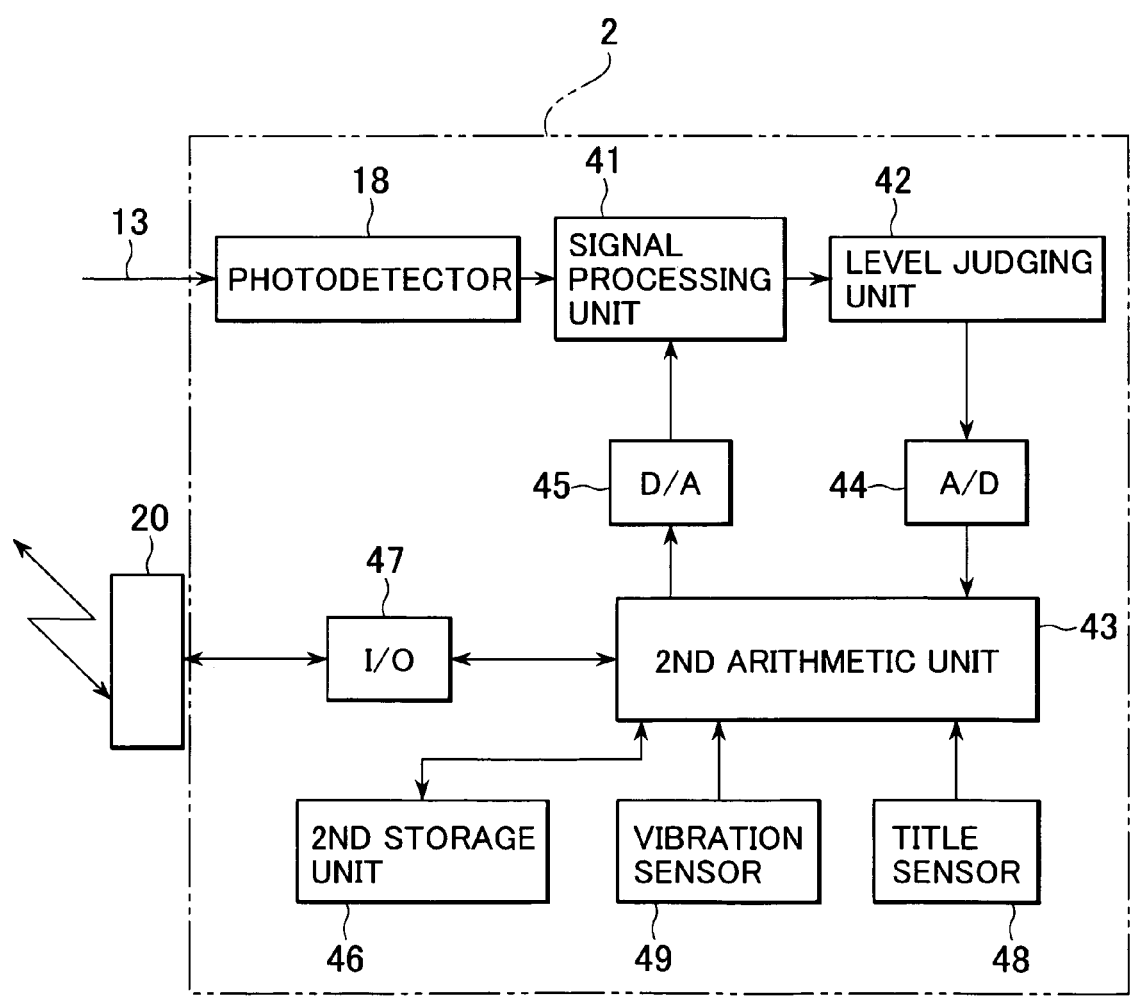
FIG. 6 is a schematical block diagram of a photodetection device used in the invention.

Referring to FIG. 6, description will be given now on the arrangement of the photodetection device 2.

The photodetection device 2 comprises the photodetector 18, a signal processing unit 41, a level judging unit 42, a second arithmetic unit 43, and a second storage unit 46, a second input/output control unit 47, and a tilt sensor 48 for detecting the tilting of the photodetection device 2.

When the photodetector 18 receives the laser beam 13, a photodetection signal to correspond to the received light amount is outputted. The signal processing unit 41 performs the processing as necessary such as amplifying on the photodetection signal and determines a peak hold value and outputs the peak hold value to the level judging unit 42.

The level judging unit 42 judges based on the peak hold value whether the received laser beam 13 is in the measuring status or in the sleeping status after decreasing the light amount. If the laser beam 13 is in the measuring status, it is judged whether the received light amount is on a photodetection level as necessary or not. The result of the judgment is outputted to the second arithmetic unit 43.

In case the level judging unit 42 judges that the photodetecting condition is in the measuring status, it is judged whether the photodetecting level is adequate or not for the measurement. The result of judgment is inputted to the second arithmetic unit 43 via an A/D converter 44.

Based on the signal from the level judging unit 42, the second arithmetic unit 43 issues an instruction signal. The instruction signal is inputted to the signal processing unit 41 via a D/A converter 45. Based on the instruction signal, gain is adjusted so that the photodetection signal from the photodetector 18 will be adequate.

When the photodetector 18 issues a photodetection signal, the second arithmetic unit 43 transmits an information to indicate that the photodetector 18 is in the photodetecting condition regardless of whether the photodetection signal is big or small to the first communication unit 20 via the second input/output control unit 47 either continuously or at a predetermined time interval.

The tilt sensor 48 detects whether the mounting pole 7 is tilted or not with respect to a vertical line, and a tilt detection signal is inputted to the second arithmetic unit 43. Based on the tilt detection signal, the second arithmetic unit 43 calculates the tilting of the mounting pole 7, and the level of the photodetecting position of the photodetection device 2 is corrected according to the result of calculation.

The second arithmetic unit 43 incorporates the tilt detection signal from the tilt sensor 48 at a predetermined time interval and calculates the changes over time of the tilt angle of the mounting pole 7. In case the tilting of the mounting pole 7 changes over time, the second arithmetic unit 43 judges that the blade 6 is moving, i.e. the construction machine 4 is in operation.

The tilt sensor 48 fulfills a function as a means to detect the operation status of the construction machine 4 and also performs a function as an operation status detecting means for detecting whether the laser measuring system is in operation status or not.

Regarding the operation status of the construction machine 4, the information is transmitted from the second communication unit 20 via the second input/output control unit 47 to the first communication unit 16 continuously or at a predetermined time interval.

Various types of programs and data are stored in the second storage unit 46. These programs include: an adequate light amount calculation program, a gain adjustment program, and a power-saving program for the photodetection device. Also, the data include: data necessary for calculating the adequate light amount, data necessary for calculating adequate gain, data table for setting the matching of the length of the time without change with power-saving mode (sleeping mode) when the tilt angle is not changed over time.

In this case, the adequate light amount calculation program calculates adequate light amount of the laser beam 13 according to a photodetection signal from the photodetector 18. The gain adjustment program calculates adequate amplification rate (gain) of the signal processing unit 41 with respect to the light amount of the laser beam 13. The power-saving program judges a sleeping mode 1, a sleeping mode 2 or a sleeping mode 3 respectively corresponding to stopping status, suspension status or operation termination status of the construction machine 4 when the changes over time of the tilting is not detected according to the tilt detection signal from the tilt sensor 48 within a predetermined time period of T1, T2 or T3. Then, operation status of the device is set up to match the sleeping mode, and the device is controlled to each of the sleeping modes respectively.

Another means for detecting operation status of the construction machine 4, e.g. a vibration sensor 49 may be provided on the photodetection device 2. Under the condition that the vibration sensor 49 detects vibration, it may be judged that the construction machine 4 is in operation.

Description will be given below on operation of the laser measuring system.

Figure 7:
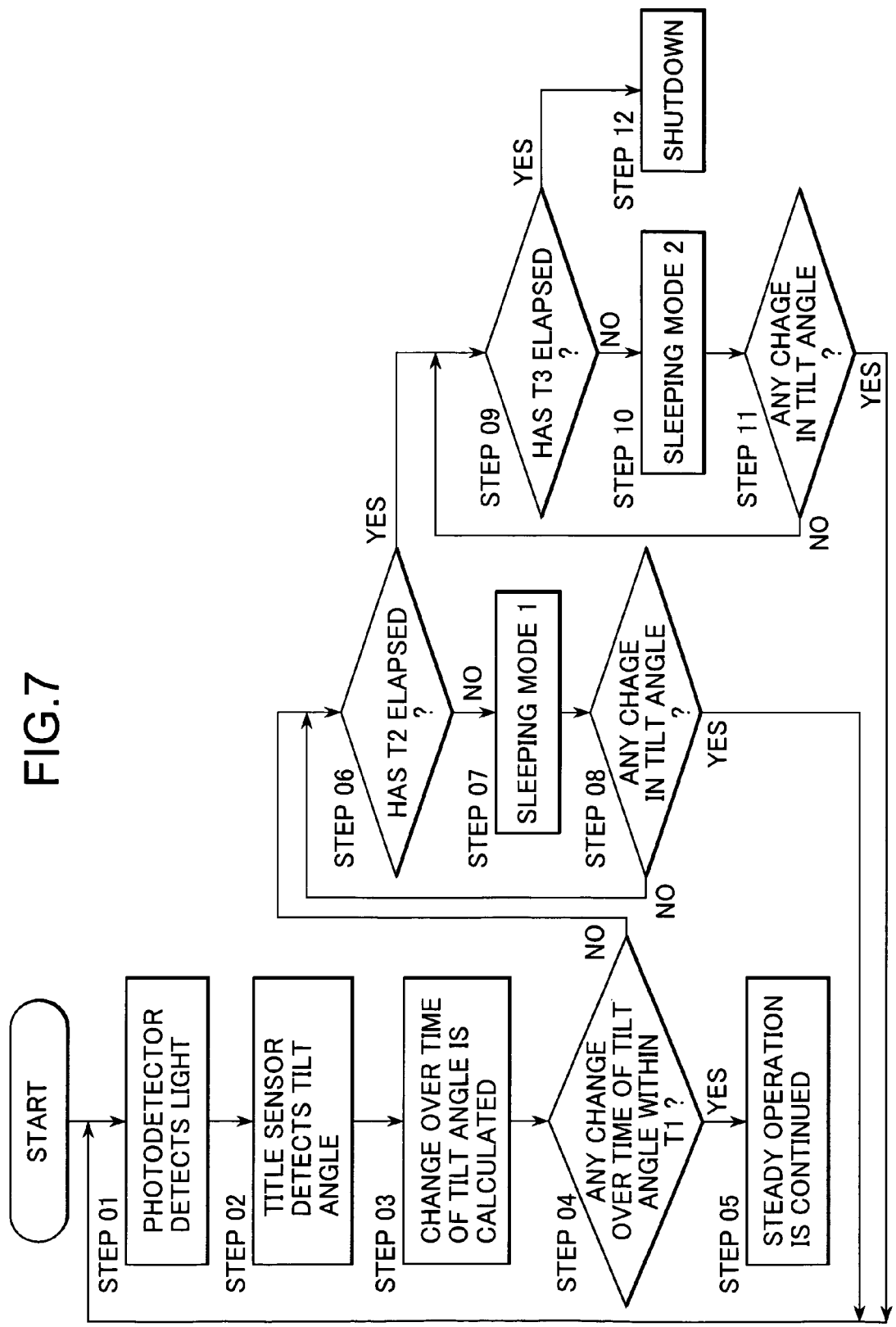
FIG. 7 is a flow chart of a first embodiment of the invention.

Referring to FIG. 7, description will be given on a first embodiment.

In the first embodiment, the tilt sensor 48 is used as the means for detecting operation status of the construction machine 4.

Power is supplied to the laser rotary irradiation device 1, and also power is supplied to the photodetection device 2, and operation of the laser measuring system is started.

The photodetector 18 of the photodetection device 2 receives the laser beam 13. By receiving the laser beam 13, the photodetection device 2 confirms that the laser measuring system has started the steady operation (Step 01).

The tilt sensor 48 detects the tilting, and the result of the detection is outputted to the second arithmetic unit 43 (Step 02).

The second arithmetic unit 43 incorporates the tilt detection signal from the tilt sensor 48 at a predetermined time interval, e.g. at a time interval of one second. The tilt detection signal is compared with the tilt detection signal previously incorporated, and it is calculated whether there is any change over time or not (Step 03).

It is judged whether the change over time has occurred before the elapse of the time T1 or not (Step 04). When the change of the tilt angle is confirmed before the elapse of the time T1, it is judged that the operation of the construction machine 4 is currently continued, and the steady operations of the laser rotary irradiation device 1 and the photodetection device 2 are continued (Step 05). The time T1 is set to about 2 to 5 minutes, for instance. More concretely, the time T1 is set from the operation unit 22 of the photodetection device 2 by giving full consideration on the condition at each individual operation site and on operation status.

When it is judged in Step 04 that there has been no change over time within the time T1, it is judged further whether the time T2 has elapsed or not (Step 06). The time T2 is set to about 5 to 30 minutes. Similarly to the case of the time T1, by giving consideration on the conditions at each operation site and operation status, the time T2 is set from the operation unit 22 of the photodetection device 2.

In the case it is judged in Step 06 that the time T2 has not elapsed, the sleeping mode 1 is selected. At the selection of the sleeping mode 1, the power-saving program for the photodetection device is started. Then, power-saving control to match the sleeping mode 1 is performed by the second arithmetic unit 43. For instance, power feeding to the photodetector 18 is stopped. The tilting sensor 48 and the second communication unit 20 are controlled so that operation will be continued.

In the power consumption of the photodetection device 2, the power consumed by the photodetector 18 occupies about 5/6 of total power consumption by the photodetecion device 2. Thus, significant power-saving effect can be attained.

As well as the photodetection device 2 is controlled in the sleeping mode 1, a sleeping mode 1 selecting instruction is transmitted to the first communication unit 16 from the second communication unit 20.

The sleeping mode 1 selecting instruction received at the first communication unit 16 is inputted to the first arithmetic unit 33 via the input/output control unit 37. Based on the sleeping mode 1 selecting instruction, the power-saving program for the laser rotary irradiation device is started, and light emitting condition of the laser beam emitter 31 is changed to the sleeping mode 1 via the light emission driving unit 35. As the sleeping mode of the laser beam emitter 31, the decrease of the emission light amount of the laser beam emitter 31 or the stopping of the light emission is included for instance. The driving condition of the scanning motor 26 by the motor driving unit 36 is changed to the sleeping mode 1. The change of the driving condition includes the decrease of the rotation speed of the scanning motor 26 or the stopping of the rotation or the like. As the power-saving control carried out in the sleeping mode 1, turning-off of the light on the display unit, suspension of the display etc. are included, too.

The operation for the leveling of the laser rotary irradiation device 1 is maintained. This is for the purpose of omitting the processing of re-setting of the reference plane when the laser rotary irradiation device is restored from the sleeping mode 1 to the steady operation. The steady operation for the first communication unit 16 is maintained so that the information and the instruction can be given to and taken from the photodetection device 2 (Step 07).

In the laser rotary irradiation device 1, the power needed for the light emission of the laser beam is in the range of about 30% to 40% of the total power consumption, and the power needed for the driving of the motor is in the range of 30% to 40%. By controlling the laser rotary irradiation device 1 to the sleeping mode 1, high power-saving effect can be attained.

Even in the sleeping mode 1, the tilt angle is detected by the tilt sensor 48. When there has been any change in the tilt angle, the laser measuring system is restored to the steady operation (Step 08).

In the case it is judged that the time T2 has elapsed in Step 06, it is judged further whether the time T3 has elapsed or not (Step 09). In this case, the time T3 is set as one hour, for instance. Similarly to the case of the time T1, the time T3 is set from the operation unit 22 of the photodetection device 2 by giving full consideration on the condition at each operation site and on operation status. The time T3 is regarded as a reference for judging the termination of operation.

In the case it is judged that the time T2 has elapsed, and further that the time T3 has not elapsed yet, the sleeping mode 2 is selected. In the sleeping mode 2, the operations of circuits, sensors, etc. other than the tilt sensor 48 and the second communication unit 20 are controlled in the suspension status.

When the photodetection device 2 is controlled in the sleeping mode 2, a sleeping mode 2 selecting instruction is transmitted to the first communication unit 16 from the second communication unit 20.

The laser rotary irradiation device 1 is controlled in the sleeping mode 2 based on the sleeping mode 2 selecting instruction as received according to the power-saving program for the laser rotary irradiation device 1. In the condition of the sleeping mode 2, the functions of the component members other than the first communication unit 16 are turned to the suspension status so that the communication can be made with the photodetection device 2 (Step 10).

Even in the status of the sleeping mode 2, the detection of tilting by the tilt sensor 48 is continued. If there is any change in the tilt angle, an operation restoration instruction is issued from the second communication unit 20 to the first communication unit 16, and the steady operation is resumed (Step 11).

In the case it is judged that the time T3 has elapsed in Step 09, the second arithmetic unit 43 issues a shutdown instruction to the laser rotary irradiation device 1 according to the power-saving program for the photodetection device. Upon receipt of the shutdown instruction, the laser rotary irradiation device 1 turns off the power source of the laser rotary irradiation device 1 according to the power-saving program for the laser rotary irradiation device. At the same time, the photodetection device 2 turns off the power source of the photodetection device 2 according to the power-saving program for the photodetection device (Step 12).

FIG. 8 shows a second embodiment of the invention.

In the second embodiment, the photodetector 18 is used as the means for detecting operation status of the construction machine 4. In the following description, the descriptions for the time T1, the time T2, the time T3, and each of the sleeping modes are the same as those described in the first embodiment, and detailed description is not given here.

When civil engineering work is carried out by using the laser measuring system as described above, the level is detected by receiving and detecting the laser beam 13 at the photodetection device 2. Therefore, if it is watched carefully whether light has been detected or not by the photodetection device 2, it is possible to detect whether the laser measuring system is in use or not.

The power source of the laser rotary irradiation device is turned on, the power source of the photodetection device 2 is turned on, and operation of the laser measuring system is started.

The photodetector 18 of the photodetection device 2 receives the laser beam 13. By the receiving of the laser beam 13, the photodetection device 2 confirms that the steady operation of the laser measuring system has been started (Step 21).

The second arithmetic unit 43 checks at a predetermined time interval, e.g. at a time interval of one second whether there has been a photodetection signal or not from the photodetector 18. It is judged whether the photodetection signal has been received or not before the time T1 has elapsed (Step 22). When the photodetection signal is confirmed before the elapse of the time T1, it is judged that the operation of the construction machine 4 is currently continued, and the steady operations of the laser rotary irradiation device 1 and the photodetection device 2 are continued (Step 23).

When it is judged in Step 22 that there has been no photodetection signal within the time T1, it is judged further whether the time T2 has elapsed or not (Step 24).

When it is judged in Step 24 that the time T2 has not elapsed yet, the sleeping mode 1 is selected. At the selection of the sleeping mode 1, the power-saving program for the photodetection device is started, and the photodetection device 2 performs the power-saving control to match the sleeping mode 1. A sleeping mode 1 selecting instruction is transmitted from the second communication unit 20 to the first communication unit 16, and the laser rotary irradiation device 1 performs power-saving control according to the power-saving program for the laser rotary irradiation device 1 (Step 25).

In the case the laser beam 13 is detected by the photodetector 18 under the condition of the sleeping mode 1, the laser measuring system is restored to the steady operation (Step 26).

In the case it is judged in Step 24 that the time T2 has elapsed, it is judged further whether the time T3 has elapsed or not (Step 27).

In the case it is judged that the time T2 has elapsed, and it is judged further that the time T3 has not elapsed, the sleeping mode 2 is selected. In the sleeping mode 2, the component members (circuits, sensor, etc.) other than the photodetector 18 and the second communication unit 20 are controlled and adjusted to the suspension status.

As well as the photodetection device 2 is controlled in the sleeping mode 2, a sleeping mode 2 selecting instruction is transmitted to the first communication unit 16 from the second communication unit 20.

In the laser rotary irradiation device 1, based on the received sleeping mode 2 selecting instruction and according to the power-saving program for the laser rotary irradiation device, the laser rotary irradiation device 1 is controlled and adjusted in the sleeping mode 2 (Step 28).

Similarly to the case of the sleeping mode 1, even in the status of the sleeping mode 2, the photodetecting operation of the laser beam 13 by the photodetector 18 is continued. When the laser beam is detected by the photodetector 18, the steady operation is started again (Step 29).

When it is judged in Step 27 that the time T3 has elapsed, the photodetection device 2 is shut down according to the power-saving program for the photodetection device, and the laser rotary irradiation device 1 is also shut down according to the power-saving program for laser rotary irradiation device (Step 30).

FIG. 9 represents a third embodiment of the invention.

In the third embodiment, the vibration sensor 49 is used as the means for detecting the operation status of the construction machine 4. In the following, the descriptions on the time T1, the time T2, the time T3 and each of the sleeping modes are the same as those described in the first embodiment, and detailed description is not given here.

In case civil engineering work is carried out by using the laser measuring system, vibration of the mounting pole 7 is detected by the vibration sensor 49. Therefore, if it is carefully watched whether there is vibration or not by the vibration sensor 49, it is possible to detect that the laser measuring system is currently in use or not.

The power source of the laser rotary irradiation device 1 is turned on, and the power source of the photodetection device 2 is also turned on. Then, the operation of the laser measuring system is started.

When vibration is detected by the vibration sensor 49, the photodetection device 2 confirms that the laser measuring system has started the steady operation (Step 41).

The second arithmetic unit 43 confirms, at a predetermined time interval, e.g. at a time interval of one second, whether a vibration detection signal has been issued from the vibration sensor 49 or not. It is judged whether the vibration detection signal has been issued or not before the elapse of the time T1 (Step 42). If the vibration detection signal is confirmed before the elapse of the time T1, it is judged that the operation by the construction machine 4 is being continued, and the steady operations of the laser rotary irradiation device 1 and the photodetection deice 2 are continued (Step 43).

In the case it is judged in Step 42 that the vibration detection signal has not been issued within the time T1, it is judged further whether the time T2 has elapsed or not (Step 44).

In the case it is judged in Step 44 that the time T2 has not elapsed yet, the sleeping mode 1 is selected. At the selection of the sleeping mode 1, the power-saving program for the photodetection device is started, and the photodetection device 2 performs the power-saving control to match the sleeping mode 1. A sleeping mode 1 selecting instruction is transmitted to the first communication unit 16 from the second communication unit 20, and the laser rotary irradiation device 1 performs power-saving control according to the power-saving program for the laser rotary irradiation device (Step 45).

When vibration is detected by the vibration sensor 49 in the sleeping mode 1, the laser measuring system is restored to the steady operation (Step 45).

In the case it is judged in Step 44 that the time T2 has elapsed, it is judged further whether the time T3 has elapsed or not (Step 47).

In the case it is judged that the time T2 has elapsed and further that the time T3 has not elapsed yet, the sleeping mode 2 is selected (Step 48). In the sleeping mode 2, operations of the component members (such as circuits and sensors like the photodetector 18, etc.) other than the vibration sensor 49 and the second communication unit 20 are controlled in the suspension status. Then, a sleeping mode 2 selecting instruction from the photodetection device 2 is transmitted to the first communication unit 16 from the second communication unit 20.

The laser rotary irradiation device 1 is also controlled to the sleeping mode 2 based on the received sleeping mode 2 selecting instruction.

When the vibration is detected by the vibration sensor 49 during the sleeping mode 2, the steady operation is resumed (Step 49).

In the case it is judged in Step 47 that the time T3 has elapsed in the status with no detection of vibration, the photodetection device 2 is shut down according to the power-saving program for the photodetection device, and the laser rotary irradiation device 1 is shut down according to the power-saving program for the laser rotary irradiation device (Step 50).

In the first embodiment, the second embodiment and the third embodiment, description has been given on the cases where the tilt sensor 48, the vibration sensor 49, and the photodetector 18 are individually used as the means for detecting the operation status of the construction machine 4, while it may be so designed that three of these detection means or any arbitrary two of these are combined together and are used as the means for detecting the operation status. By such combination, the accuracy to detect the suspension status and the termination status of the laser measuring system can be improved, and this contributes to the prevention of erroneous operation in the transition to the sleeping mode.

In the above, description has been given on two aspects of the sleeping mode, while one aspect or three aspects or more may be provided for the sleeping mode.

According to the present invention, wasteful power consumption can be avoided without requiring the intervention of operation staff when the laser measuring system is not currently in use, and this is helpful in achieving successful power-saving effect.

What is claimed is:

1. A power-saving control method in a laser measuring system, which comprises a laser rotary irradiation device for forming a laser reference plane by projecting a laser beam in rotary irradiation and a photodetection device for carrying out position measurement by receiving the laser beam, comprising a step of detecting using status of the photodetection device by said photodetection device, a step of selecting steady operation or power-saving mode based on the detection of using status, a step of transmitting a power-saving mode transition instruction to said laser rotary irradiation device by said photodetection device when the power-saving mode is selected, a step of receiving the power-saving mode transition instruction by said laser rotary irradiation device, and a step of executing power-saving control.

2. A power-saving control method in a laser measuring system according to claim 1, wherein the using status of said photodetection device is judged by detecting at least one of laser beam photodetecting condition by said photodetection device, changes over time of tilting of said photodetection device, said vibration of said photodetection device.

3. A power-saving control method in a laser measuring system according to claim 1, wherein the transition to the power-saving mode is judged based on the fact that non-using status of said photodetection device has continued for a predetermined time period.

4. A power-saving control method in a laser measuring system according to claim 1, wherein said power-saving mode includes at least power-saving operation and shutdown of power supply of said laser rotary irradiation device.

5. A power-saving control method in a laser measuring system according to claim 1, wherein said power-saving mode includes power-saving operations of said laser rotary irradiation device and said photodetection device and shutdowns of power supply to said laser rotary irradiation device and said photodetection device.

6. A power-saving control method in a laser measuring system according to claim 1, wherein leveling operation of said laser rotary irradiation device is also maintained during the power-saving mode.

7. A laser measuring system, comprising a laser rotary irradiation device and a photodetection device, wherein said laser rotary irradiation device comprises a laser beam emitter, a rotator for projecting a laser beam in rotary irradiation, a first communication means for performing communication to and from said photodetection device, and a first control unit for controlling operation status of said laser rotary irradiation device including light emitting condition of said laser beam emitter and rotating condition of said rotator to steady operation and to power-saving mode, and wherein said photodetection device comprises a photodetector for detecting the laser beam, a second communication means for performing communication to and from said laser rotary irradiation device, a using status detecting means for detecting the using status of said photodetection device, and a second control unit for judging transition to power-saving mode based on the result of detection from said using status detecting means, wherein a power-saving mode transition instruction is transmitted to said laser rotary irradiation device via said second communication means and said first communication means, and said first control unit controls operation status of said laser rotary irradiation device to the power-saving mode based on the power-saving transition instruction.

8. A laser measuring system according to claim 7, wherein said using status detecting means is at least one of a photodetector for detecting the photodetecting condition of the laser beam, a tilt sensor for detecting the tilting of said photodetection device and a vibration sensor for detecting the vibration of said photodetection device.

9. A laser measuring system according to claim 7, wherein, in said power-saving mode, the light emitting condition of the laser beam of said laser rotary irradiation device is controlled to the decrease of emission light amount or to the stopping of the light emission.

10. A laser measuring system according to claim 7, wherein, in said power-saving mode, the rotation status of said rotator of said laser rotary irradiation device is controlled to the decrease of the rotation speed or to the stopping of the rotation.

* * * * *